(12) United States Patent
Borkenhagen

(10) Patent No.: US 7,334,070 B2
(45) Date of Patent: Feb. 19, 2008

(54) MULTI-CHANNEL MEMORY ARCHITECTURE FOR DAISY CHAINED ARRANGEMENTS OF NODES WITH BRIDGING BETWEEN MEMORY CHANNELS

(75) Inventor: John Michael Borkenhagen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 10/977,770

(22) Filed: Oct. 29, 2004

(65) Prior Publication Data

US 2006/0095592 A1    May 4, 2006

(51) Int. Cl.
*G06F 13/00* (2006.01)
*G06F 15/16* (2006.01)
*H04J 1/16* (2006.01)

(52) U.S. Cl. .................. 710/100; 709/251; 370/221; 370/222; 370/223; 370/224

(58) Field of Classification Search ............. 710/100; 709/251; 370/221–224
See application file for complete search history.

(56) References Cited

U.S. PATENT DOCUMENTS

| | | | |
|---|---|---|---|
| 4,542,502 A * | 9/1985 | Levinson et al. ........... 370/403 |
| 4,723,241 A | 2/1988 | Grobel et al. | |
| 4,914,625 A | 4/1990 | Billian | |
| 5,081,452 A | 1/1992 | Cozic | |
| 5,136,589 A | 8/1992 | Konishi | |
| 5,317,569 A | 5/1994 | Ralph et al. | |
| 6,658,509 B1 * | 12/2003 | Bonella et al. ............. 710/100 |
| 7,127,554 B2 | 10/2006 | Buckingham | |
| 2004/0158675 A1* | 8/2004 | Hirose ........................ 711/115 |
| 2004/0236877 A1 | 11/2004 | Burton | |
| 2004/0252644 A1 | 12/2004 | Constantinescu | |
| 2005/0060629 A1 | 3/2005 | Cochran et al. | |
| 2005/0105350 A1 | 5/2005 | Zimmerman | |
| 2005/0108469 A1 | 5/2005 | Freeman et al. | |
| 2005/0138267 A1* | 6/2005 | Bains et al. ................ 711/100 |
| 2005/0146919 A1 | 7/2005 | Ellis et al. | |
| 2006/0004968 A1 | 1/2006 | Vogt | |

* cited by examiner

*Primary Examiner*—Mark H. Rinehart
*Assistant Examiner*—Jeremy S Cerullo
(74) *Attorney, Agent, or Firm*—Wood Herron & Evans LLP (57) ABSTRACT

Multiple memory channels of a multi-channel memory architecture are effectively bridged together to enable data traffic associated with various nodes in daisy chain arrangement to be communicated over both memory channels. For example, a daisy chain arrangement of nodes, such as FB-DIMM memory modules disposed in a first memory channel may be coupled to a second memory channel, with support for communicating data associated with one of the nodes over either or both of the first and second memory channels.

30 Claims, 5 Drawing Sheets

MULTI-CHANNEL MEMORY ARCHITECTURE FOR DAISY CHAINED ARRANGEMENTS OF NODES WITH BRIDGING BETWEEN MEMORY CHANNELS

FIELD OF THE INVENTION

The invention relates to computers and data processing systems, and in particular to communication links used to couple multiple nodes in a data processing system together in a daisy chain arrangement.

BACKGROUND OF THE INVENTION

Computer technology continues to advance at a remarkable pace, with numerous improvements being made to the performance of both processors—the "brains" of a computer—and the memory that stores the information processed by a computer.

One aspect of computer technology that can have a significant impact on system performance is the communication between various components in a computer or other data processing system. The communications between components such as processors, memory devices, processing complexes (sets of interconnected processors and memory devices), peripheral devices, and even separate computers, can have a significant effect on the overall performance of a computer system. Moreover, even from the perspective of individual components, and the various sub-components that may be disposed on the same or separate integrated circuit chips, the manner in which data is communicated within a computer system is often a significant contributor to the speed and computing power of the system.

For example, one prevalent architecture utilized to connect memory devices to a processor is a multidrop bus architecture, where a plurality of address and data lines are routed between a processor or intermediate memory controller to a plurality of memory devices. The various lines in the bus essentially couple the memory devices in parallel with one another, and each device receives the same signals. Typically, shared bus architectures of this type, despite improvements in terms of greater width (number of address and/or data lines) and data transmission rates, have been hampered by a number of drawbacks. First, the parallel nature of the architecture, and the resulting signal alignment issues that are raised by communicating data in a parallel fashion, have become limiting factors on the overall performance of the architecture. Moreover, the aforementioned issues also place limits on the lengths of the interconnects, and thus the types of connectors and form factors that are supported. Furthermore, these architectures are characterized by relatively high connector counts, thus requiring a high number of signal paths between devices.

One relatively recent memory architecture that has been utilized to address some of the shortcomings of a shared bus architecture involves the use of point-to-point interconnects between multiple nodes or components in a data processing system. Often, the point-to-point interconnects utilize serial transmission as opposed to parallel transmission, which can reduce the number of interconnects, while providing comparable or greater transmission speed due to the elimination of many of the signal alignment issues raised by parallel architectures. Some point-to-point architectures rely on complex switching to route data to desired components or nodes; however, other point-to-point architectures rely on individual nodes or components to forward data intended for other components coupled to the architecture.

In many applications, the use of point-to-point interconnects provides comparatively greater performance, as well as reduced connection counts and greater flexibility in terms of interconnecting components or nodes coupled to the architecture. Moreover, through the use of redundant connections, greater reliability may be provided, whereby the failure of a connection or a particular node may be overcome by routing data communications around a failed node.

As noted above, while some point-to-point architectures rely on complex switching or redundant connections, other point-to-point architectures desirably omit comparable data routing functionality to reduce complexity and cost, and to increase overall performance in some applications.

One such architecture is often referred to as a daisy chain architecture, where a sequence of nodes or components are interconnected by means of point-to-point interconnects coupled between adjacent nodes in the system. Often, the point-to-point interconnects comprise pairs of unidirectional interconnects, with one unidirectional interconnect used for communicating data in one direction between the adjacent nodes, and the other interconnect used to forward data in the opposite direction between the nodes. In such a configuration, the unidirectional interconnects form two unidirectional communication links, ensuring the data can be communicated between any two nodes in the architecture.

Incumbent in a daisy chain architecture is a capability within each node for forwarding data destined for a subsequent node in the architecture to the next adjacent node. In this regard, many daisy chain architectures provide driver circuits that essentially relay or repeat received signals and forward such signals as necessary to the next node in the architecture.

One specific example of a daisy chain architecture is implemented in the fully buffered dual inline memory module (FB-DIMM) memory architecture, for which a formal specification has been established by the Joint Electron Device Engineering Council, (JEDEC) of the Electronic Industry's Alliance (EIA). The FB-DIMM specification defines a high speed serial interface in which a memory controller is coupled to an FB-DIMM, upon which is disposed multiple memory devices and a controller device incorporating an interface between the memory devices and the high speed serial interface. The controller device also includes driver circuitry for repowering received signals and passing those signals along to the next FB-DIMM in the chain.

As with other memory controller designs, many FB-DIMM memory controllers support multiple memory channels, whereby separate daisy chain arrangements of FB-DIMM's are coupled to each memory channel, permitting the memory channels to operate independently and in parallel with one another.

The high speed serial communication links between the components in an FB-DIMM architecture include separate unidirectional read and write channels made up of sets of differential signal pairs, and over which data and address information is passed. Separate clocking and control buses are also provided, but not implemented using point-to-point interconnects.

It has been found, however, that a conventional daisy chain architecture such as the FB-DIMM architecture is not readily suited for use in some high availability applications. In particular, one benefit of a conventional shared bus architecture is ability to provide "hot" replacement or swapping of individual devices in an architecture. For example, some conventional shared bus memory architectures support the ability to remove and replace individual memory devices while a system is running, and without requiring the system to be shut down. In such circumstances, power is typically removed from an individual device, the device is physically removed from its connector (e.g., a slot for a memory device disposed on a module or card), a new device is inserted into the connector, and power is applied to the new device. So long as the system logic avoids attempts to access the device being replaced during the replacement procedure, other devices may continue to be accessed during the procedure, thus ensuring continued system availability. Furthermore, since the devices are essentially coupled in parallel via a shared bus, and all signals are propagated to all devices, the unavailability of one particular device does not interrupt the communication of signals to other devices.

A daisy chain architecture such as FB-DIMM, on the other hand, relies on individual components (here each FB-DIMM) to forward signals received from previous components in the chain to subsequent components in the chain. As such, an individual FB-DIMM could not be powered off and removed from the system without causing a discontinuity in high speed serial interface that would prevent data from being communicated between the memory controller and any subsequent FB-DIMM's in the daisy chain.

As a result, conventional FB-DIMM and other daisy chain configurations may not be suitable for use in applications where high availability is desired.

SUMMARY OF THE INVENTION

The invention addresses these and other problems associated with the prior art by effectively bridging multiple memory channels together in a multi-channel memory architecture to enable data traffic associated with various nodes in daisy chain arrangement to be communicated over both memory channels. Specifically, embodiments consistent with the invention couple a daisy chain arrangement of nodes, e.g., memory modules, disposed in a first memory channel to a second memory channel, with support for communicating data associated with one of the nodes over either or both of the first and second memory channels.

In one embodiment, for example, a multi-channel memory controller may couple a first memory channel to one end of a daisy chain arrangement of memory modules, and couple a second memory channel to the opposite end of the daisy chain arrangement (either directly or indirectly through another daisy chain arrangement of memory modules. By doing so, a discontinuity introduced in the daisy chain arrangement (e.g., due to a failure or removal of a node or a failure in a communication link coupled to a node), which would otherwise inhibit communication between the memory controller and any nodes located downstream of the discontinuity over the first memory channel, can be overcome by communicating data associated with any such downstream nodes over the second memory channel. In addition, in some embodiments, load balancing may be utilized to optimize bandwidth utilization and latencies over both memory channels, thus improving overall memory system performance.

Consistent with one aspect of the invention, a circuit arrangement may be utilized in a multi-channel memory system of the type including first and second memory channels, wherein each memory channel is configured to couple a plurality of nodes to one another in a daisy chain arrangement. The circuit arrangement may include a memory port configured to be coupled to the first memory channel, and a control circuit coupled to the memory port and configured to communicate data associated with a node in the second memory channel through the memory port and over the first memory channel. Consistent with another aspect of the invention, the circuit arrangement may be disposed in a memory controller circuit. Consistent with another aspect of the invention, the circuit arrangement may be disposed in a memory module.

Consistent with yet another aspect fo the invention, an apparatus is provided, which includes a memory controller, a daisy chain arrangement of memory modules, and a bridging interconnect. The memory controller includes first and second memory ports respectively configured to drive first and second memory channels, with the daisy chain arrangement of memory modules disposed in the first memory channel and coupled at a first end to the first memory port. The bridging interconnect is coupled between the second memory port and a second end of the daisy chain arrangement of memory modules to enable the memory controller to communicate data associated with a memory module in the daisy chain arrangement over the second memory channel.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The embodiments discussed and illustrated hereinafter utilize bridging between multiple memory channels in a multi-channel memory architecture or system to enable data traffic associated with nodes disposed in a daisy chain configuration coupled to a particular memory channel to be communicated over multiple memory channels. In the context of the invention, data is associated with a particular node when that data either is output by, or directed to, that node. Moreover, such data may include various types of information, including for example, write data, read data, command data, address information, status information, configuration information or practically any other type of information that may be input to or output by a node.

Also in the context of the invention, a daisy chain configuration is a point-to-point configuration whereby multiple nodes are chained together via point-to-point interconnects between adjacent nodes (i.e., nodes that are immediately next to one another in a defined sequence of nodes), which is in contrast to a multi-drop bus architecture whereby a shared bus is used to communicate information to all nodes. Individual nodes in a daisy chain configuration are typically able to receive data from a communication link and automatically forward such data along the communication link to subsequent nodes in the configuration if such data is not intended for local consumption.

Figure 1:
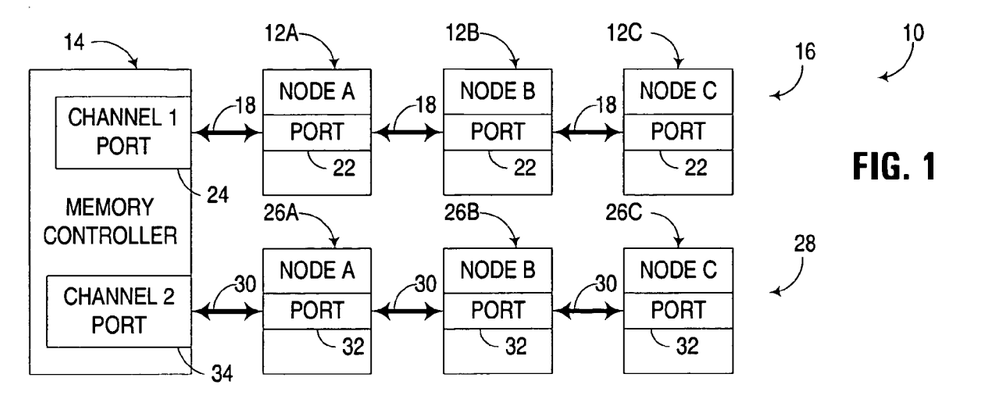
FIG. 1 is a block diagram of an exemplary multi-channel memory system incorporating first and second daisy chain arrangements of nodes.

For example, as shown in the Drawings, wherein like numbers denote like parts throughout the several views, and in particular in FIG. 1, a multi-channel memory system 10 may incorporate for a first memory channel a first plurality of nodes 12A-12C interconnected to one another and to a memory controller 14 in a first daisy chain arrangement 16 by a plurality of communication links 18. Each node 12A-12C includes a memory port 22, and memory controller 14 includes a first channel memory port 24. Likewise, for a second memory channel, multi-channel memory system 10 may incorporate a second plurality of nodes 26A-26C interconnected to one another and to memory controller 14 in a second daisy chain arrangement 28 by a plurality of communication links 30. Each node 26A-26C includes a memory port 32, and memory controller 14 includes a second channel memory port 34.

It will be appreciated that each communication link 18, 30, as well as the individual interconnect paths therein, may be implemented using any number of serial and/or parallel data signal paths, including, for example, any number of differential signal pairs and/or single-ended signal paths. It will also be appreciated that additional interconnects, e.g., a shared or multi-drop bus, may also be provided between memory controller 14 and nodes 12A-12C and 26A-26C in some applications, e.g., to provide power, clocking, or additional control signals.

Of note, nodes 12A-12C and nodes 26A-26C each define a sequence of nodes, with both starting (nodes 12A and 26A) and ending (nodes 12C and 26C) nodes defined for the sequence. In addition, a node that is farther away from a memory controller is considered to be "downstream" of a node that is closer to the memory controller, while a node that is closer to the memory controller than another node is considered to be "upstream" of the other node. It should also be appreciated that each daisy chain arrangement of nodes can include any number of nodes, and furthermore, that memory controller 14 may support any number of memory channels.

As will be apparent to one of ordinary skill in the art, one characteristic of a daisy chain configuration of nodes is that a discontinuity in a communication link (e.g., due to failure or shutdown of a node, or a failure in an interconnect between two nodes) conventionally inhibits the ability to relay data across the discontinuity. As such, a discontinuity such as the unavailability of node 12B, for example, would inhibit data from being communicated over the first memory channel from memory controller 14 to node 12C, and vice versa.

Figure 2:
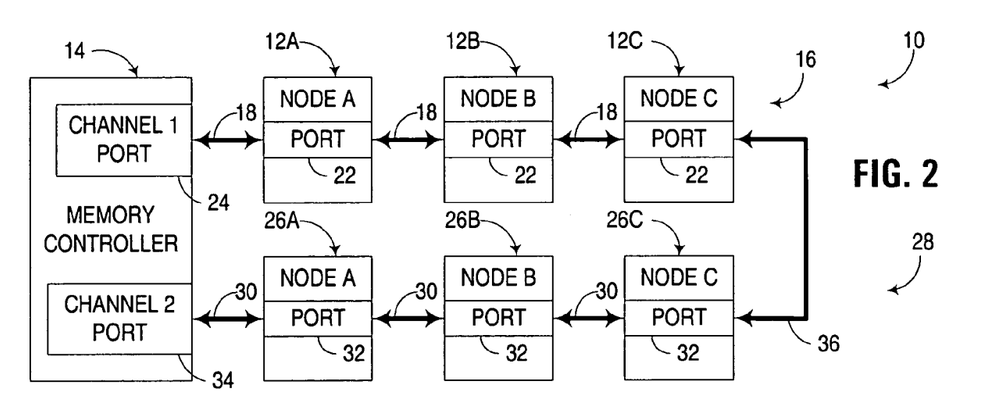
FIG. 2 is a block diagram the multi-channel memory system of FIG. 1, including a bridge interconnect coupling together the first and second daisy chain arrangements of nodes.

Embodiments consistent with the invention address this difficulty in part by bridging together multiple memory channels to permit data traffic associated with a node on one memory channel to be communicated over another memory channel. FIG. 2, for example, illustrates the addition of a bridging interconnect 36 coupling together the ending nodes 12C, 26C of the pair of daisy chain arrangements 16, 28.

The significance of such a configuration will be appreciated in the context of the scenario where a discontinuity arises in the first daisy chain arrangement 16, e.g., due to the unavailability of node 12B (which may be due to a failure in node 12B, a failure in an interconnect 18 coupled to node 12B, or simply due to node 12B being taken off-line). In this configuration, so long as the second memory channel supports the communication of data associated with nodes coupled to the first memory channel, data associated with node 12C from first daisy chain arrangement 16 may be communicated between node 12C and memory controller 14 via the path defined by communication links 30, nodes 26A-26C and bridging interconnect 36.

To support the ability to communicate data associated with a node on one memory channel over another memory channel, typically each node and the memory controller are configured to pass the data in such a manner that the data is identified as being associated with the proper node on the proper memory channel, as well as to ensure that all of the data necessary to perform a desired operation is communicated over the appropriate memory channel. In the FB-DIMM implementation discussed hereinafter, for example, the Advanced Memory Buffer (AMB) chip on each memory module is specifically configured to support all types of data traffic (i.e., read data, write data, command data and status data) on both the read and write channels. Furthermore, the memory controller is specifically configured to direct data traffic to the proper memory channel, as appropriate. It will be appreciated that the implementation of such functionality into a memory controller and an AMB chip in an FB-DIMM environment, as well as in other multi-channel memory systems, would be well within the abilities of one of ordinary skill in the art having the benefit of the instant disclosure.

Again referring to FIG. 2, when no discontinuity is present in a daisy chain arrangement, embodiments consistent with the invention may operate in a conventional manner, routing data associated with nodes 12A-12C over the first memory channel, and routing data associated with nodes 26A-26C over the second memory channel. In the alternative, it may be desirable to utilize load balancing functionality to optimize bandwidth utilization and latencies over both memory channels, which may improve memory system performance. Any number of conventional load balancing algorithms may be used in such an implementation consistent with the invention. Moreover, it will be appreciated that some implementations may use load balancing functionality without addressing discontinuities in the manner described herein.

Figure 3:
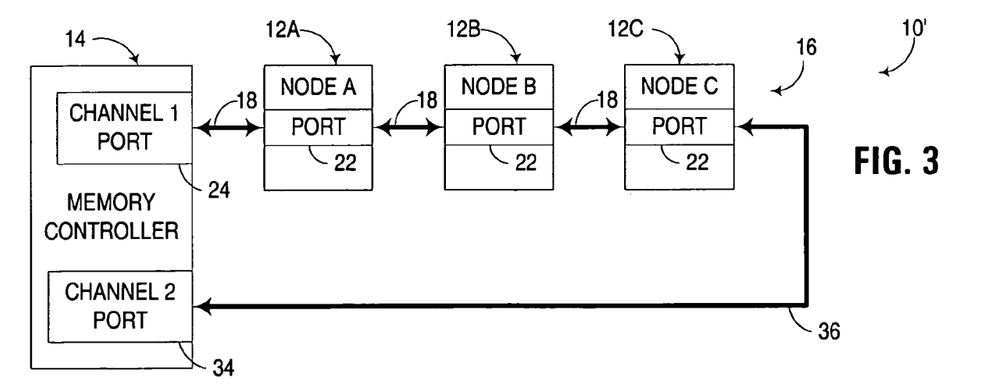
FIG. 3 is a block diagram of the multi-channel memory system of FIG. 2, shown with the bridge interconnect coupled directly to a second memory channel port on the memory controller.

It will be appreciated that the number of nodes in each daisy chain arrangement may differ from one another. Moreover, it will be appreciated that the principles of the invention may be utilized in situation where no daisy chain arrangement of nodes is resident in a particular memory channel. As shown in multi-channel memory system 10' of FIG. 3, for example, bridging interconnect 36 may be directly coupled to second channel memory port 34, with no intervening daisy chain arrangement of nodes. By doing so, data associated with any nodes that are downstream of a discontinuity in first daisy chain arrangement 16 may still be communicated to and from such nodes over the second memory channel. It will be appreciated that such an implementation may be particularly useful in hardware environments where a memory controller supports multiple memory channels, but the memory/cost/performance requirements of such hardware environments dictate that one or more of such memory channels would otherwise go unused (e.g., in a cost sensitive, modest performance application where only a limited amount of memory is required, and can be satisfied using only a few memory modules coupled together in a single daisy chain arrangement).

Figure 4:
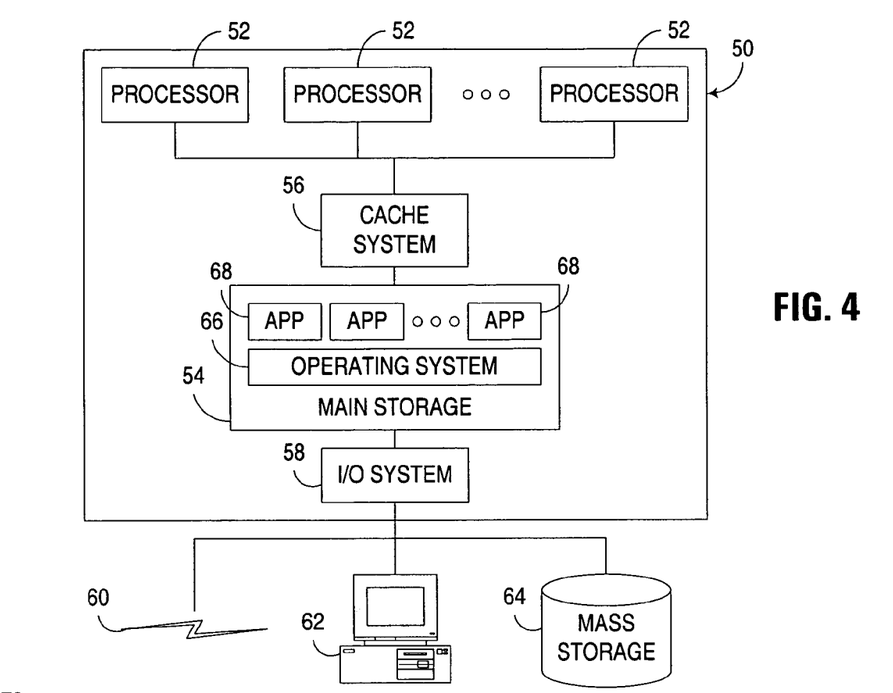
FIG. 4 is a block diagram of an exemplary apparatus incorporating an FB-DIMM memory architecture consistent with the invention.

As noted above, a multi-channel memory system may be used in a number of applications consistent with the invention. FIGS. 4-9, for example, illustrate one implementation of the invention within a memory architecture that is compatible with the Fully Buffered Dual Inline Memory Module (FB-DIMM) standard. FIG. 4, in particular, illustrates a computer 50, which generically represents, for example, any of a number of multi-user computers such as a network server, a midrange computer, a mainframe computer, etc. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like), such as set top boxes, game machines, etc.

Computer 50 generally includes one or more processors 52 coupled to a main storage 54 through one or more levels of cache memory disposed within a cache system 56. In some embodiments each processor 52 may include multiple processing cores. Furthermore, main storage 54 is coupled to a number of types of external devices via a system input/output (I/O) system 58, e.g., one or more networks 60, one or more workstations 62 and one or more mass storage devices 64. Any number of alternate computer architectures may be used in the alternative.

Also shown resident in main storage 54 is a typical software configuration for computer 50, including an operating system 66 (which may include various components such as kernels, device drivers, runtime libraries, etc.) accessible by one or more applications 68.

Computer 50, or any subset of components therein, may also be referred to hereinafter as an "apparatus". It should be recognized that the term "apparatus" may be considered to incorporate various data processing systems such as computers and other electronic devices, as well as various components within such systems, including individual integrated circuit devices or combinations thereof. Moreover, within an apparatus may be incorporated one or more circuit arrangements, typically implemented on one or more integrated circuit devices, and optionally including additional discrete components interfaced therewith.

It should also be recognized that circuit arrangements are typically designed and fabricated at least in part using one or more computer data files, referred to herein as hardware definition programs, that define the layout of the circuit arrangements on integrated circuit devices. The programs are typically generated in a known manner by a design tool and are subsequently used during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices, those skilled in the art will appreciate that circuit arrangements consistent with the invention are capable of being distributed as program products in a variety of forms, and that the invention applies equally regardless of the particular type of computer readable signal bearing media used to actually carry out the distribution. Examples of computer readable signal bearing media include but are not limited to recordable type media such as volatile and non-volatile memory devices, floppy disks, hard disk drives, CD-ROM's, and DVD's, among others, and transmission type media such as digital and analog communications links.

Figure 5:
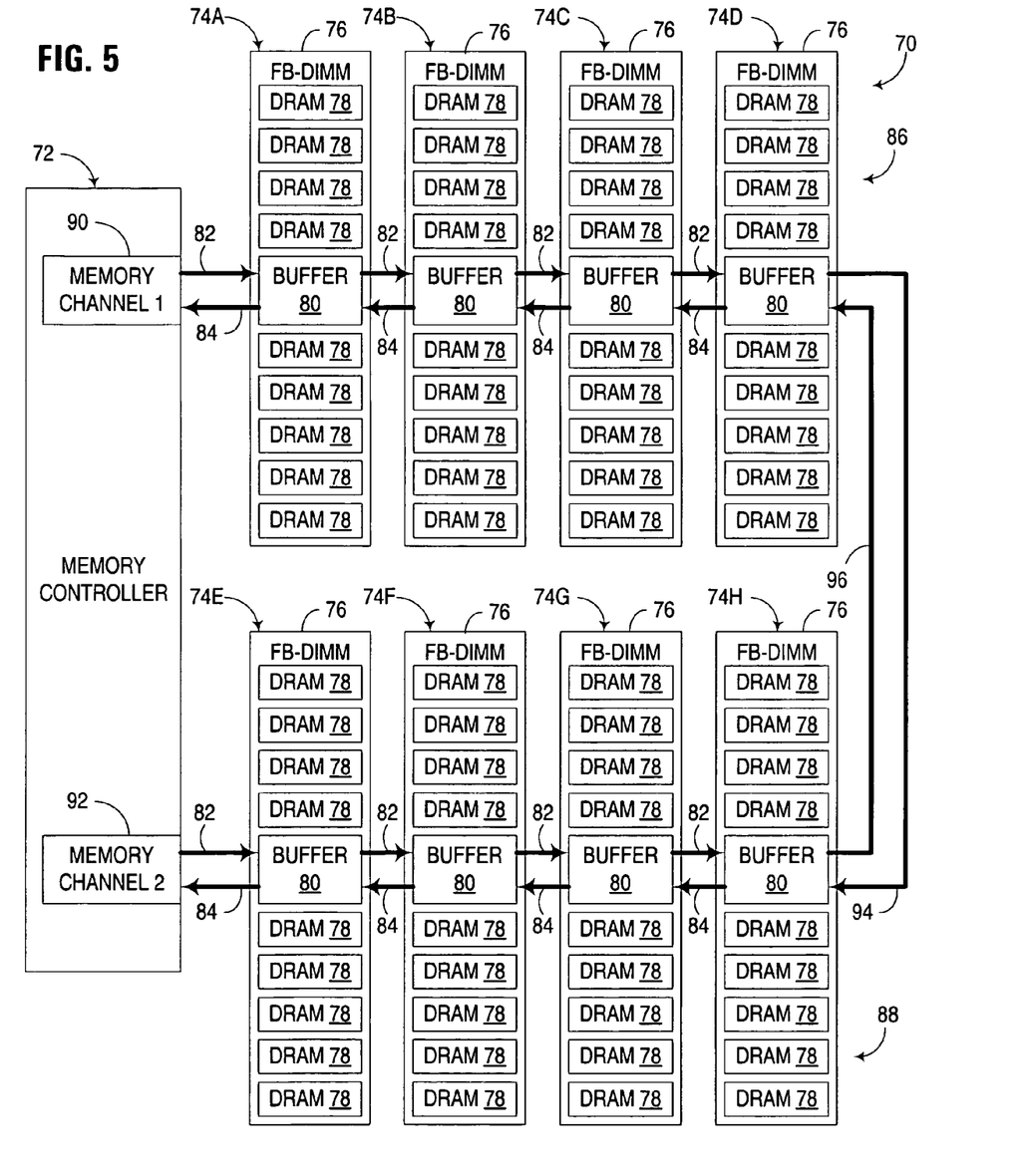
FIG. 5 is a block diagram of an exemplary FB-DIMM compatible implementation of the main storage in the apparatus of FIG. 4.

FIG. 5 next illustrates an exemplary memory architecture 70 consistent with the invention, and usable, for example, within main storage 54 of computer 50 (FIG. 4). Architecture 70 is illustrated including a memory controller 72 and a plurality of FB-DIMM memory modules 74A, 74B, 74C, 74D, 74E, 74F, 74G and 74H. Each memory module 74A-74H is typically implemented using a printed circuit board or card 76 upon which is disposed a plurality of dynamic random access memory (DRAM) memory devices 78 and a buffer integrated circuit device or chip 80, the latter of which implementing an Advanced Memory Buffer (AMB) and controller consistent with the FB-DIMM specification. Each card 76 is typically received in a cooperative slot (not shown), which in the illustrated embodiment, is capable of being selectively powered on and off to permit removal and replacement of a memory module in the slot.

Memory modules 74A-74E are interconnected with one another and with memory controller 72 via pairs of unidirectional high speed differential serial communication links defined by a plurality of point-to-point interconnects 82, 84.

As shown in FIG. 5, nodes 74A-74D represent nodes in a first daisy chain arrangement 86 and nodes 74E-74F represent nodes in a second daisy chain arrangement 88. While four memory modules are illustrated in each daisy chain arrangement, it will be appreciated that any number of memory modules may be utilized consistent with the invention.

In this configuration, first daisy chain arrangement 86 is shown coupled to a first memory channel 90 driven by memory controller 72, while second daisy chain arrangement 88 is shown coupled to a second memory channel 92 driven by memory controller 72. Given the FB-DIMM standard's reliance of pairs of unidirectional high speed differential serial communication links in each memory channel, interconnects 82 are write channel interconnects that define a write data channel over which write data and commands are communicated from memory controller 72, while interconnects 84 are read channel interconnects that define a read data channel over which data and status information is provided to memory controller 72 by one or more of modules 74A-74H. As such, it will be appreciated that each memory channel 90, 92 is itself comprised of individual read and write data channels. It will be appreciated that additional interconnects, e.g., power, clocking and other control interconnects, are also provided by the FB-DIMM standard, but are not shown in FIG. 5.

To implement bridging between the first and second memory channels, memory architecture 70 additionally includes a bridging interconnect comprising a pair of point-to-point interconnects 94, 96, both of which are coupled between otherwise unused end connections of ending or last memory modules (here memory modules 74D and 74H) of each daisy chain arrangement 86, 88. In addition, it should be noted that interconnect 94 couples the write data channel of first memory channel 90 to the read data channel of second memory channel 92, while interconnect 96 couples the read data channel of first memory channel 90 to the write data channel of second memory channel 92.

By configuring interconnects 94, 96 in this manner, write data and/or commands emitted from second memory channel 92 and intended for consumption by one of memory modules 74A-74D in first daisy chain arrangement 86 may be propagated along write channel interconnects 82 coupling memory modules 74E-74H to one another and to memory controller 72, over bridging interconnect 96 and then along read channel interconnects 84 coupling memory modules 74A-74D to one another until the desired destination is reached. Likewise, read data and/or commands intended to be supplied by one of memory modules 74A-74D to memory controller 72 via second memory channel 92 may be propagated along write channel interconnects 82 coupling memory modules 74A-74D to one another, over bridging interconnect 94 and then along read channel interconnects 84 through nodes 74E-74H and ultimately to the memory port for second memory channel 92 in memory controller 72. For communicating data associated with a memory module 74E-74H over first memory channel 90, a corresponding flow of data occurs in a similar manner to that described above for communicating data associated with a memory module 74A-74D over second memory channel 92.

Figure 6:
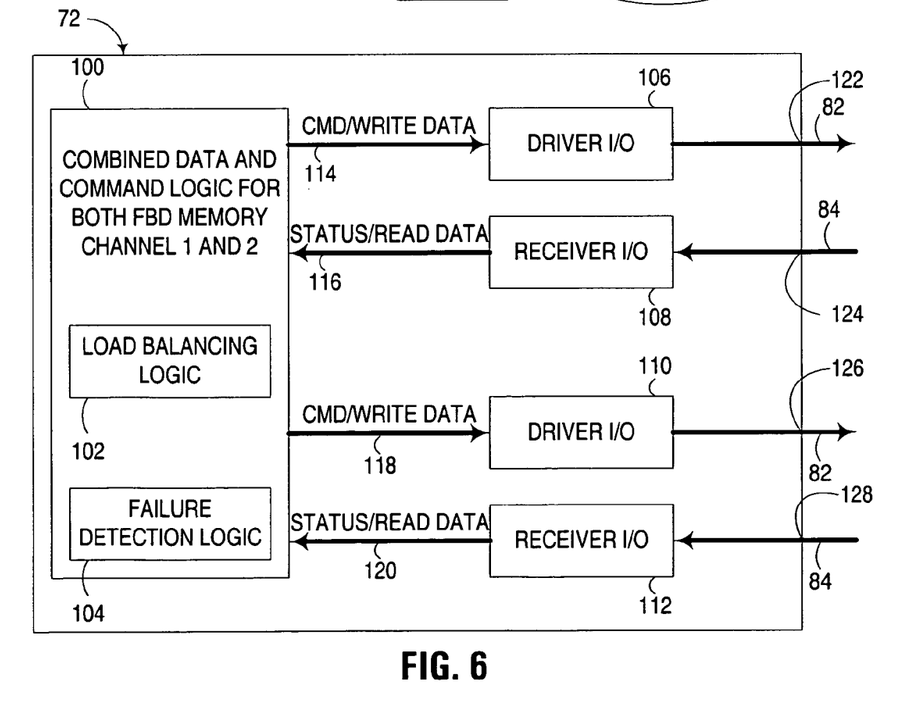
FIG. 6 is a block diagram of an exemplary implementation of the memory controller of FIG. 5.

FIG. 6 next illustrates an exemplary implementation of memory controller 72, specifically showing the Input/Output (I/O) circuitry utilized to drive a pair of memory channels, each of which including individual read and write data channels. Additional circuitry in the controller, e.g., the interface to the processor or system bus, or integrated cache memories, have been omitted from FIG. 6. In this implementation, memory controller 72 is shown with a pair of memory ports respectively configured to drive a pair of memory channels. In particular, a first channel memory port is defined by a write channel data port 122 and a read channel data port 124, respectively coupled to interconnects 82, 84 of the first memory channel. Likewise, a second channel memory port is defined by a write channel data port 126 and a read channel data port 128, respectively coupled to interconnects 82, 84 of the second memory channel. It will be appreciated that memory controller 72 may support more than two memory channels in other embodiments.

Memory controller 72 may include, for example, data and command logic block 100, which is utilized to initiate read and write operations in the memory storage and interface with a host processor. Incorporated into block 100 is load balancing logic 102, which is capable of implementing any number of load balancing algorithms to balance traffic between the first and second memory channels. Block 100 also includes failure detection logic 104, which is used to monitor the memory devices in the memory architecture, and may include, for example, Error Correcting Code (ECC) circuitry for correcting single or multi-bit failures, in a manner known in the art.

To drive the write data channel of the first memory channel, memory controller 72 includes a driver I/O block 106, which receives command/write data traffic over a data interconnect 114. Block 106 outputs to write channel data port 122 to drive an interconnect 82. Likewise, for the read data channel of the first memory channel, a receiver I/O block 108 is coupled to an interconnect 84 via a read channel data port 124, outputting status/read data traffic to block 100 via a data interconnect 116.

For the write data channel of the second memory channel, memory controller 72 includes a driver I/O block 110, which receives command/write data traffic over a data interconnect 118, and which outputs to write channel data port 126 to drive an interconnect 82. Likewise, for the read data channel of the second memory channel, a receiver I/O block 112 is coupled to an interconnect 84 via a read channel data port 128, outputting status/read data traffic to block 100 via a data interconnect 120.

Figure 7:
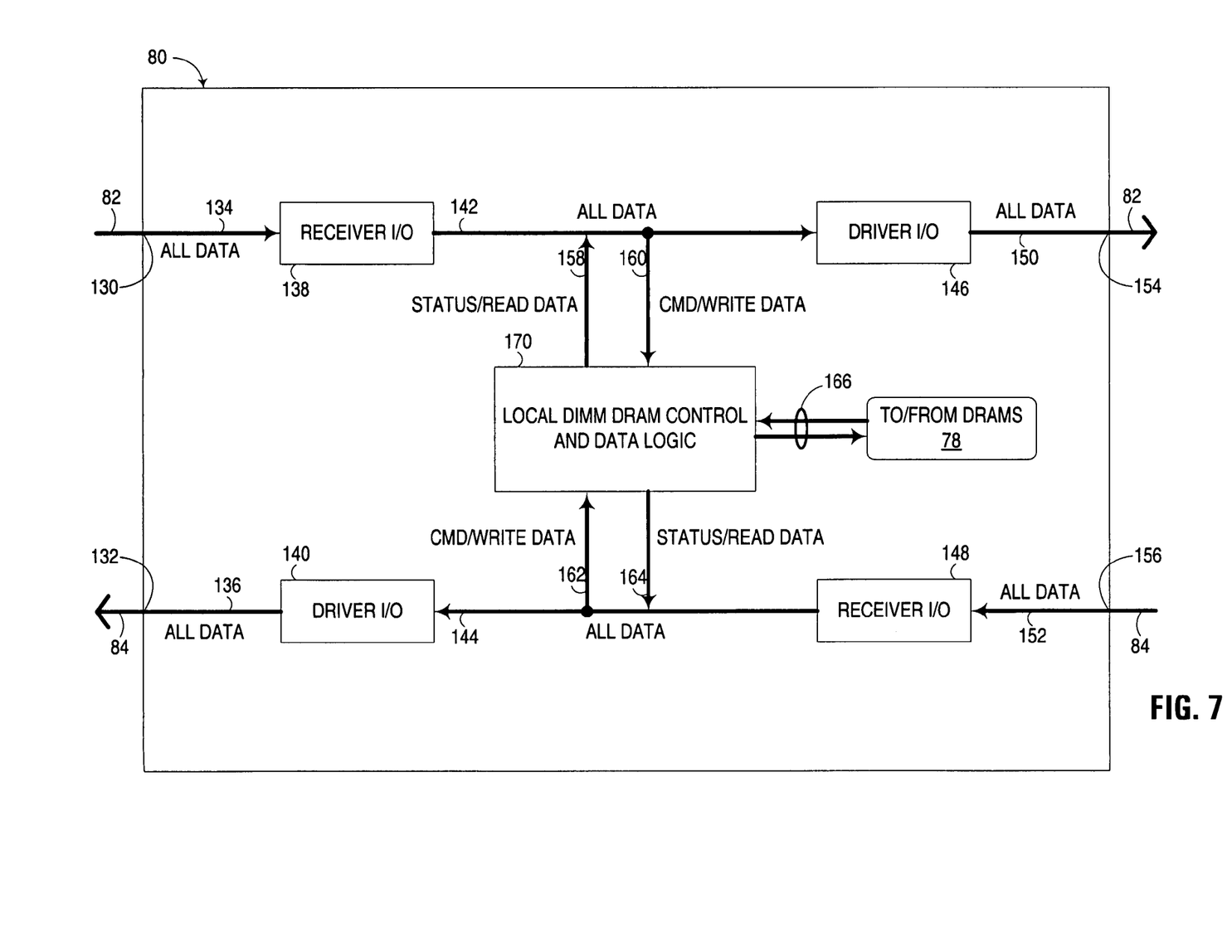
FIG. 7 is a block diagram of an exemplary implementation of one of the buffers of FIG. 5.

FIG. 7 next illustrates an exemplary implementation of buffer device 80 on each module 74A-74H. Buffer device 80 implements an FB-DIMM compatible Advanced Memory Buffer (AMB), and as a result, includes two memory ports, with the first memory port including a write channel input data port 130 and a read channel output data port 132, respectively configured for coupling to write and read data channels from an upstream node in the memory architecture, and with the second memory port including a write channel output data port 154 and a read channel input data port 156, respectively configured for interconnection to a downstream node in the memory architecture.

Buffer device 80 includes a local DIMM DRAM control and data logic block 170, which is utilized to provide an interface between the write and read data channels and the various memory devices 78 on the respective module (e.g., via an internal memory bus 166). For the write data channel, a receiver I/O block 138 is coupled to data port 130 via a data interconnect 134, and outputs over an interconnect 142 both to block 170 (via interconnect 160) and to a driver I/O block 146. Block 146 is used to repower/repeat the data traffic received by block 146, for outputting to a subsequent node via data interconnect 150 coupled to data port 154.

Likewise, for the read data channel, incoming data traffic from port 156 is received by a receiver I/O block 148 over a data interconnect 152. The output of block 148 is fed over a data interconnect 144 to a driver I/O block 140, which repowers/repeats the data traffic over port 132 via data interconnect 136. In addition, block 170 is also capable of outputting data to data interconnect 144 via data interconnect 164.

In a conventional FB-DIMM AMB design, command and write data forwarded to the AMB via the write data channel is received by block 170 via data port 130, receiver I/O block 138 and interconnects 134, 142 and 160. Likewise, status and read data is output by block 170 over the read data channel via data port 132, driver I/O block 140 and interconnects 136, 144 and 164.

To support the ability to receive and/or transmit data associated with the local memory module over a different memory channel (i.e., a memory channel other than that within which the local memory module is disposed), buffer device 80 includes an additional pair of interconnects 158, 162. Interconnect 158 is configured to output status and read data for the local memory module over the write data channel via data port 154, driver I/O block 146 and interconnects 142 and 150. Interconnect 162 is configured to receive command and write data directed to the local memory module over the read data channel via data port 156, receiver I/O block 148 and interconnects 152 and 144. As such, it will be appreciated that interconnects 134, 142 and 150, receiver I/O block 138, driver I/O block 146 and data ports 130, 154, which are normally used in a write data channel, are additionally configured to communicate status and read data. Furthermore, interconnects 136, 144 and 152, receiver I/O block 140, driver I/O block 148 and data ports 132, 156, which are normally used in a read data channel, are additionally configured to communicate command and write data.

In addition, it will be appreciated that block 170 is typically configured to monitor both interconnects 160, 162 for command and write data directed to the local memory module, and to output any status or read data over both interconnects 158, 164. Block 170 may be configured to always output in such a manner, or alternatively may be configurable (either dynamically or statically) to operate in a special mode, whereby when the special mode is not enabled, the buffer device 80 operates in a conventional manner. As another alternative, block 170 may be configurable to selectively output status or read data over only one of interconnects 158, 164 (e.g., to switch between the interconnects). Various manners of configuring block 170 to operate in a different mode may be used, e.g., via directing a command to the block over the read or write data channel, or via sideband signals or dedicated control lines coupled to the buffer device 80.

As with memory controller 72, buffer device 80 may be implemented in a number of alternate manners consistent with the invention. Moreover, the implementation of the functionality of memory controller 72 and device 80 in integrated circuit devices would be within the ability of one of ordinary skill in the art having the benefit of the instant disclosure.

In normal operation, memory controller 72 may selectively route command and write data intended for any of memory modules 74A-74H over either (or both) of the first and second memory channels. In one embodiment, for example, conventional FB-DIMM protocols may be used, whereby all data related to a memory module disposed in one memory channel is routed only over that memory channel. In the alternative, as noted above, any number of load balancing algorithms may be utilized to optimize bandwidth and latency in the memory system, whereby command and write data directed to a memory module in one memory channel is selectively routed over either of the memory channels. In other embodiments, write and command data may be output over both memory channels even when no discontinuity is detected.

From the standpoint of status and read data output by any given memory module, the memory module may output the data only over its associated memory channel, or in the alternative, may route data over both memory channels. Furthermore, load balancing may be utilized within a memory module to balance data traffic. A memory module may alternatively route status or read data over a selected memory channel, e.g., based upon an indicator provided in the command to which the memory module is returning the data, based upon a sideband or external control signal, or based upon the port from which the command was initially received.

In addition, whenever a faulty memory module or interconnect is detected, whenever it is desired to replace a specific memory module, or otherwise whenever a discontinuity arises in a daisy chain arrangement of memory modules, command and write data may be routed from the memory controller over the appropriate memory channel, and status and read data may be routed by a particular memory module over the appropriate memory channel, to avoid the discontinuity. In one embodiment, all data traffic for each memory channel is replicated on the other memory channel. Furthermore, in some embodiments, the presence of a discontinuity may invoke a special mode whereby the data traffic flow is altered to account for the discontinuity.

Figure 8:
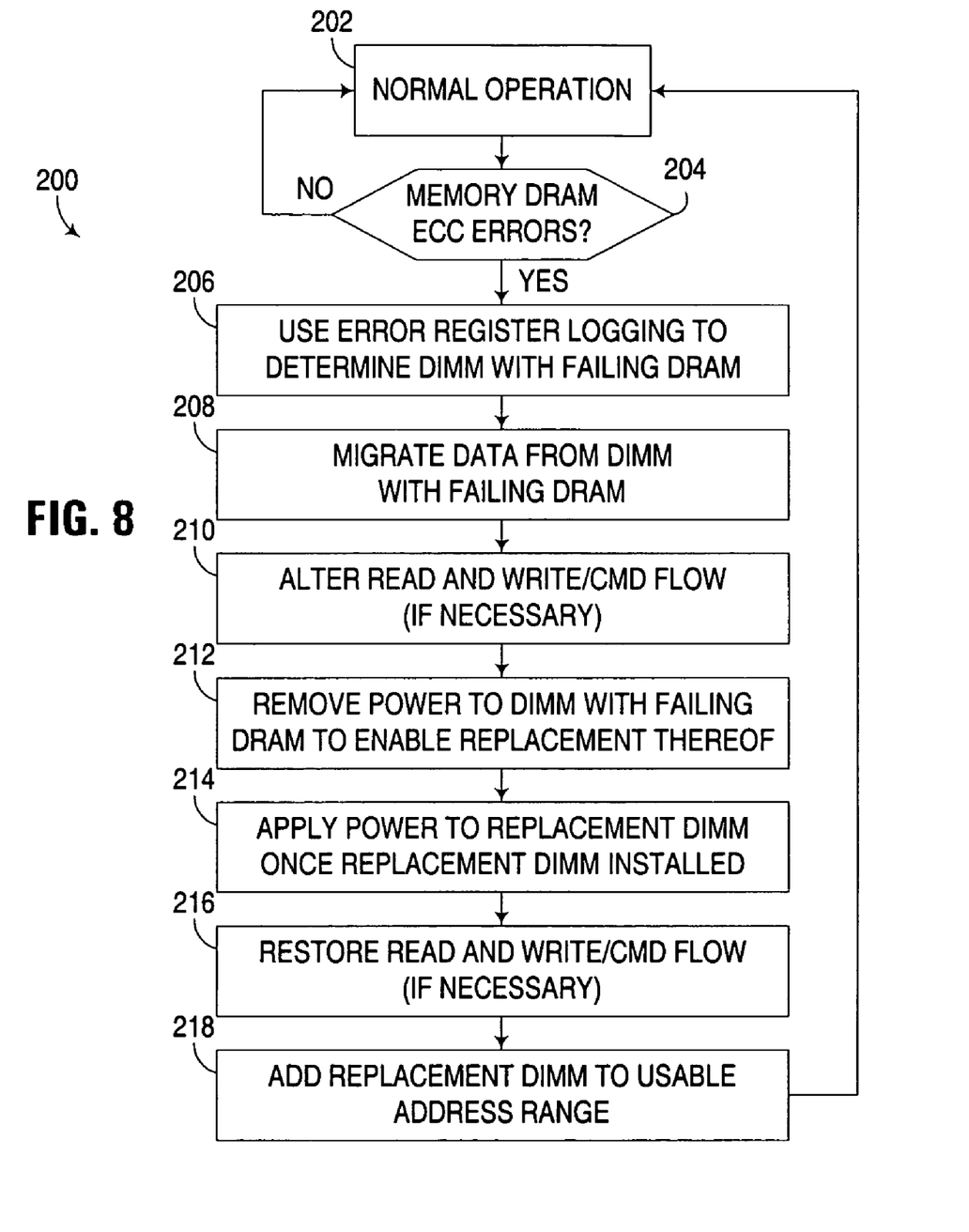
FIG. 8 is a flowchart illustrating the steps performed in connection with performing a hot replace of one of the FB-DIMM modules of FIG. 5.

Now turning to FIG. 8, an exemplary flowchart 200 illustrates the steps that may be performed in connection with performing a hot replace of one of the FB-DIMM modules of FIG. 5. In particular, block 202 represents the normal operation of the memory architecture, while block 204 represents the detection of memory ECC errors. For example, block 204 may determine whether more than a threshold amount of memory errors are being detected. If a sufficient threshold is met in block 204, control may pass to block 206 to use error register logging to determine which of the FB-DIMM modules is sourcing the errors. Next, block 208 migrates the data stored in the failing FB-DIMM to other, operational FB-DIMM's, and optionally paging memory out to non-volatile storage as necessary using conventional mechanisms.

Next, block 210 alters the read and write/command flow to effectively route data traffic around the failing FB-DIMM. The altering of the data flow may be implemented in a number of manners, e.g., by transitioning the memory controller and/or each memory module to operate in a special mode via a command, or through the use of side band signals or dedicated control lines. In the alternative, where each memory module is normally configured to relay data traffic associated with memory modules on the read and write channels, to monitor both the read and write channel for command and write data, and to output status and read data over both the read and write channel, no modification or reconfiguration of each memory module may be required, with the only change in data flow being effected by the memory controller. Furthermore, where the memory controller normally replicates data flow over both memory channels, no alteration of data flow may be necessary, whereby block 210 may be omitted.

Next, block 212 removes power from the slot for the failing FB-DIMM to enable a user to replace that failing FB-DIMM. Thereafter, once the failing FB-DIMM has been physically replaced with a replacement FB-DIMM, block 214 applies power to the replacement FB-DIMM, which typically initiates an initialization process for the replacement FB-DIMM. In addition, it may also be desirable to transmit configuration information from the memory controller to the replacement FB-DIMM to configure the replacement FB-DIMM to operate in the current environment.

Thereafter, block 216 restores the read and write/command flow (if necessary), thus restoring normal operation. Block 218 then adds the replacement FB-DIMM to the usable address range for the main storage, whereby the replacement FB-DIMM may then be utilized for the storage of working data in a manner known in the art.

It will be appreciated that any of blocks 206-218 may be initiated automatically, or alternatively, may be initiated in response to user control, e.g., after a notification to a user of a potential failure condition. It will also be appreciated that, in addition to enabling hot replacement of failing FB-DIMM's, the herein-described configuration may be utilized to address other situations in which a discontinuity exists in a daisy chain architecture, e.g., in the event of a failed interconnect or a total failure of an FB-DIMM.

It will also be appreciated that, in connection with the normal operation in block 202 and/or during the error recovery operation, load balancing may be utilized in the manner described herein.

Additional modifications may be made consistent with the invention. Therefore the invention lies in the claims hereinafter appended.

What is claimed is:

1. An apparatus, comprising:
   a memory controller including first and second memory ports respectively configured to drive first and second Fully Buffered Dual Inline Memory Module (FB-DIMM) memory channels, wherein each FB-DIMM memory channel comprises a unidirectional serial read channel and a unidirectional serial write channel respectively configured to communicate read and write data, wherein the first memory port in the memory controller includes a pair of unidirectional serial read and write ports respectively configured to couple to the unidirectional serial read and write channels of the first FB-DLMM memory channel, and wherein the second memory port in the memory controller includes a pair of unidirectional serial read and write ports respectively configured to couple to the unidirectional serial read and write channels of the second FB-DIMM memory channel;

a first plurality of FB-DIMM memory modules coupled to the unidirectional serial read and write channels of the first memory channel of the memory controller in a first daisy chain arrangement, each FB-DIMM memory module in the first plurality of FB-DIMM memory modules including a buffer device and a plurality of DRAM devices, and a last FB-DIMM memory module among the first plurality of FB-DIMM memory modules being disposed at an opposite end of the first daisy chain arrangement from the memory controller;

a second plurality of Fully Buffered Dual Inline Memory Module (FB-DIMM) memory modules coupled to the unidirectional serial read and write channels of the second memory channel of the memory controller in a second daisy chain arrangement, each FB-DIMM memory module in the second plurality of FB-DIMM memory modules including a buffer device and a plurality of DRAM devices, and a last FB-DRAM memory module among the second plurality of FB-DRAM memory modules being disposed at an opposite end of the second daisy chain arrangement from the memory controller; and a bridging interconnect coupling together the last FB-DIMM memory modules from the first and second pluralities of FB-DIMM memory modules to enable data to be communicated over one of the first and second memory channels between the memory controller and a FB-DIMM memory module coupled to the other of the first and second memory channels, wherein the bridging interconnect comprises first and second unidirectional interconnects, the first unidirectional interconnect coupling the read channel of the first FB-DIMM memory channel to the write channel of the second FB-DIMM memory channel, and the second unidirectional interconnect coupling the write channel of the first FB-DIMM memory channel to the read channel of the second FB-DIMM memory channel.

2. A circuit arrangement for a memory controller for use in a multi-channel memory system of the type including first and second memory channels, wherein each memory channel is configured to couple a plurality of nodes to one another in a daisy chain arrangement, and wherein each memory channel comprises a unidirectional serial read channel and a unidirectional serial write channel respectively configured to communicate read and write data, the circuit arrangement comprising:

a first memory port configured to be coupled to the first memory channel, the first memory port including a pair of unidirectional serial read and write ports respectively configured to couple to the unidirectional serial read and write channels of the first memory channel;

a second memory port configured to be coupled to the second memory channel, the second memory port including a pair of unidirectional serial read and write ports respectively configured to couple to the unidirectional serial read and write channels of the second memory channel; and a control circuit coupled to the first memory port and the second memory port and configured to drive each of the first and second memory channels through the respective first and second memory ports, the control circuit further configured to communicate data associated with a node in the second memory channel through the first memory port and over the first memory channel.

3. The circuit arrangement of claim 2, wherein the control circuit is further configured to communicate data associated with a node in the first memory channel through the second memory port and over the second memory channel, and wherein the control circuit is further configured to identify, for a first command being issued over one of the first and second memory channels, with which node on which memory channel the first command is associated.

4. The circuit arrangement of claim 2, wherein the first and second memory ports are respectively configured to be coupled to first and second daisy chain arrangements of memory modules, and wherein the control circuit is configured to communicate data associated with a node in the second memory channel over the first memory channel by routing data between the first and second memory channels using a bridging interconnect coupling together last memory modules from each of the first and second daisy chain arrangements, wherein the bridging interconnect comprises first and second unidirectional interconnects, the first unidirectional interconnect coupling the read channel of the first memory channel to the write channel of the second memory channel, and the second unidirectional interconnect coupling the write channel of the first memory channel to the read channel of the second memory channel.

5. The circuit arrangement of claim 4, wherein the first and second memory ports are respectively configured to be coupled to first and second daisy chain arrangements of FB-DIMM memory modules, and wherein the first and second memory channels are FB-DIMM memory channels.

6. The circuit arrangement of claim 4, wherein the control circuit is configured to load balance data traffic associated with nodes in the second memory channel by selectively directing first and second portions of the data traffic over the first and second memory ports.

7. The circuit arrangement of claim 4, wherein the control circuit is configured to communicate with a memory module disposed in the second memory channel but isolated from the second memory port by a discontinuity in the second daisy chain arrangement by directing data through the first memory port and over the first data channel and bridging interconnect.

8. A circuit arrangement for use in a memory module in a multi-channel memory system of the type including first and second memory channels, wherein each memory channel is configured to couple a plurality of nodes to one another in a daisy chain arrangement, and wherein each memory channel comprises a unidirectional serial read channel and a unidirectional serial write channel respectively configured to communicate read and write data, the circuit arrangement comprising:

a first memory port configured to be coupled to the first memory channel, the first memory port including a read channel output port and a write channel input port configured to couple to the unidirectional serial read and write channels of the first memory channel to communicate with a preceding node in a daisy chain arrangement disposed in the first memory channel;

a second memory port configured to be coupled to the first memory channel, the second memory port including a read channel input port and a write channel output port configured to couple to the unidirectional serial read and write channels of the first memory channel to communicate with a succeeding node in the daisy chain arrangement, and wherein the read channel input port and the write channel output port are configured to be coupled to a node in the second memory channel via a bridging interconnect when the read channel input port and the write channel output port are disposed in a last node in the daisy chain arrangement; and a control circuit coupled to the first and second memory ports and configured to communicate data associated with a node in the second memory channel through the first and second memory ports and over the first memory channel, wherein the control circuit is further configured to monitor both of the read and write channel input ports for incoming write data associated with the memory module.

9. The circuit arrangement of claim 8, wherein the second memory channel includes a read channel and a write channel, wherein the read channel input port is configured to be coupled to the write channel of the second memory channel when disposed in a last node in the daisy chain arrangement, and wherein the write channel output port is configured to be coupled to the read channel of the second memory channel when disposed in a last node in the daisy chain arrangement.

10. The circuit arrangement of claim 8, wherein the first and second memory ports and the control circuit are disposed in a memory module, and wherein the control circuit is configured to route outgoing read data associated with the memory module over both of the read and write channel output ports.

11. The circuit arrangement of claim 8, wherein the memory module is an FB-DIMM memory module, and wherein the control circuit is disposed in a buffer integrated circuit device disposed in the FB-DIMM memory module.

12. An integrated circuit device comprising the circuit arrangement of claim 2.

13. A memory controller comprising the circuit arrangement of claim 2.

14. A memory module, comprising:
a plurality of memory storage devices; and
an integrated circuit device including the circuit arrangement of claim 2.

15. The memory module of claim 14, wherein the integrated circuit device comprises a buffer.

16. The memory module of claim 14, wherein the memory module is an FB-DIMM module.

17. An apparatus, comprising:
a memory controller including first and second memory ports respectively configured to drive first and second memory channels, wherein each memory channel comprises a unidirectional serial read channel and a unidirectional serial write channel respectively configured to communicate read and write data, wherein the first memory port in the memory controller includes a pair of unidirectional serial read and write ports respectively configured to couple to the unidirectional serial read and write channels of the first memory channel, and wherein the second memory port in the memory controller includes a pair of unidirectional serial read and write ports respectively configured to couple to the unidirectional serial read and write channels of the second memory channel;

a daisy chain arrangement of memory modules disposed in the unidirectional serial read and write channels of the first memory channel and coupled at a first end to the unidirectional serial read and write ports of the first memory port; and a bridging interconnect coupled between the second memory port and a second end of the daisy chain arrangement of memory modules to enable the memory controller to communicate data associated with a memory module in the daisy chain arrangement over the second memory channel, wherein the bridging interconnect comprises first and second unidirectional interconnects, the first unidirectional interconnect coupling the read channel of the first memory channel to the write channel of the second memory channel, and the second unidirectional interconnect coupling the write channel of the first memory channel to the read channel of the second memory channel.

18. The apparatus of claim 17, further comprising a second daisy chain arrangement of memory modules disposed in the second memory channel and coupled at a first end to the second memory port, wherein the bridging interconnect is coupled between a second end of the second daisy chain arrangement and the second end of the first daisy chain arrangement.

19. The apparatus of claim 18, wherein each memory module includes a control circuit configured to monitor both of the read and write channels in the first memory channel for incoming write data associated with such memory module, and to route outgoing read data associated with the memory module over both of the read and write channels in the first memory channel.

20. The apparatus of claim 17, wherein the memory controller is configured to load balance data traffic associated with daisy chain arrangement of memory modules by selectively directing first and second portions of the data traffic over the first and second memory channels.

21. The apparatus of claim 17, wherein the memory controller is configured to communicate with a memory module disposed in the first memory channel but isolated from the first memory port by a discontinuity in the first daisy chain arrangement by directing data through the second memory port and over the second data channel and the bridging interconnect.

22. The apparatus of claim 21, wherein the memory controller is configured to detect the discontinuity.

23. The apparatus of claim 22, wherein the discontinuity includes at least one of a faulty memory module and a faulty interconnect in the first memory channel.

24. The apparatus of claim 17, wherein the memory controller and each memory module are FB-DIMM compatible, and wherein the first and second memory channels are FB-DIMM memory channels.

25. A method of communicating data in a multi-channel memory system of the type including a memory controller and first and second memory channels, wherein each memory channel comprises a unidirectional serial read channel and a unidirectional serial write channel respectively configured to communicate read and write data, wherein the first memory channel includes a plurality of nodes coupled to one another in a daisy chain arrangement, the method comprising:
communicating over the first memory channel first data associated with a selected node among the plurality of nodes; and
communicating over the second memory channel second data associated with the selected node;

wherein communicating the second data includes routing data between the first and second memory channels using a bridging interconnect including first and second unidirectional interconnects, the first unidirectional interconnect coupling the read channel of the first memory channel to the write channel of the second memory channel, and the second unidirectional interconnect coupling the write channel of the first memory channel to the read channel of the second memory channel.

26. The method of claim 25, further comprising communicating over the second memory channel third data associated with a node disposed in a second daisy chain arrangement of node in the second memory channel.

27. The method of claim 25, wherein each node comprises an FB-DIMM memory module, and wherein the first and second memory channels are FB-DIMM memory channels.

28. The method of claim 25, further comprising load balancing data traffic associated with nodes in the first daisy chain arrangement by selectively directing first and second portions of the data traffic over the first and second memory channels.

29. The method of claim 25, wherein communicating the second data occurs while the selected node is isolated from the memory controller over the first memory channel by a discontinuity in the first daisy chain arrangement.

30. A method of replacing a memory module in a memory architecture of the type comprising a plurality of memory modules arranged in a daisy chain arrangement and interconnected to a memory controller and to one another by a first memory channel, the method comprising:

communicating read and write data between the memory controller and the plurality of memory modules over the first memory channel;

powering down a selected memory module among the plurality of memory modules to enable replacement of the selected memory module with a replacement memory module;

while the selected memory module is powered down, communicating read and write data between the memory controller and at least one memory module disposed downstream of the selected memory module in the daisy chain arrangement over a second memory channel and a bridging interconnect that bridges the first and second memory channels, wherein each of the first and second memory channels comprises a unidirectional serial read channel and a unidirectional serial write channel respectively configured to communicate read and write data, and wherein the bridging interconnect includes first and second unidirectional interconnects, the first unidirectional interconnect coupling the read channel of the first memory channel to the write channel of the second memory channel, and the second unidirectional interconnect coupling the write channel of the first memory channel to the read channel of the second memory channel; and after replacement of the selected memory module with the replacement memory module, applying power to the replacement memory module.

* * * * *